United States Patent
Burmester et al.

(10) Patent No.: US 12,297,914 B2
(45) Date of Patent: May 13, 2025

(54) GATE VALVE

(71) Applicant: GEA Tuchenhagen GmbH, Büchen (DE)

(72) Inventors: Jens Burmester, Grambek (DE); Jörg Pieplow, Rondeshagen (DE)

(73) Assignee: GEA Tuchenhagen GmbH, Büchen (DE)

( * ) Notice: Subject to any disclaimer, the term of this patent is extended or adjusted under 35 U.S.C. 154(b) by 0 days.

(21) Appl. No.: 18/035,196

(22) PCT Filed: Nov. 1, 2021

(86) PCT No.: PCT/EP2021/080263
§ 371 (c)(1),
(2) Date: May 3, 2023

(87) PCT Pub. No.: WO2022/096414
PCT Pub. Date: May 12, 2022

(65) Prior Publication Data
US 2024/0011568 A1  Jan. 11, 2024

(30) Foreign Application Priority Data
Nov. 3, 2020 (DE) ............ 10 2020 006 723.9

(51) Int. Cl.
*F16K 1/44* (2006.01)
(52) U.S. Cl.
CPC .................. *F16K 1/446* (2013.01)

(58) Field of Classification Search
CPC ....................................... F16K 1/446
See application file for complete search history.

(56) References Cited

U.S. PATENT DOCUMENTS

| 8,469,055 B2 * | 6/2013 | Burmester ............ F16K 1/446 |
| | | 251/63 |
| 2011/0005611 A1 | 1/2011 | Burmester |
| 2011/0197985 A1 | 8/2011 | Fontenit et al. |

FOREIGN PATENT DOCUMENTS

| DE | 41 18 874 A1 | 12/1992 | |
| EP | 0 545 846 A1 | 6/1993 | |
| EP | 0 646 741 B1 | 9/1996 | |
| GB | 2076116 A * | 11/1981 | ............ F16K 1/446 |
| WO | 2009/115255 A1 | 9/2009 | |

* cited by examiner

Primary Examiner — Hailey K. Do
(74) Attorney, Agent, or Firm — Young Basile Hanlon & MacFarlane, P.C.

(57) ABSTRACT

A gate valve includes a housing, a first port, a second port, a passage between the ports, a valve seat formed at the passage, a closing element, which has a closure member that can be brought into sealing contact with the valve seat and has a valve stem, and a seal that cooperates with a seat. To improve the cleanability of the seal, the seat includes a closed position seat mounted on a component that is displaceable relative to the valve stem.

20 Claims, 5 Drawing Sheets

GATE VALVE

TECHNICAL FIELD

This disclosure relates to a gate valve.

BACKGROUND

Drives of a generic type are used in systems for actuating valves for the production of food products, beverages, medicines, and fine chemical products, as well as in biotechnology.

These applications require a hygienic design of the valve. This also affects those locations at which stems, with which the closing bodies in the interior of the valve can be adjusted, leave the immediate product-carrying interior. At such a location, a sliding seal can be provided on the stem. It is recommendable to design these seals to be cleanable.

Such cleaning of the seal in a double-seat valve is disclosed in the prior art.

WO 2009/115255 A1 and EP 0 646 741 B1 disclose arrangements by means of which the seal can be exposed for cleaning in a cleaning step. Both documents show such arrangements. EP 0 646 741 B1 additionally shows a cleaning of the actuator-side seal designed to slide on a closing body section. An even older document is DE 41 18 874 A1, which also shows a cleaning of the actuator-side seal.

In EP 0 646 741 B1, the cleaning position for said seal is coupled to the cleaning position of the main seals on the valve seats. The actuator operated by a pressure medium is therefore designed to perform a partial stroke in addition to the full stroke or main stroke.

SUMMARY

An object of the disclosure is to create a gate valve with improved seal cleaning.

A gate valve described herein is equipped with a housing, a first port, a second port, a passage provided between the ports, a valve seat formed at the passage, a closing element with a closure member that can be brought into sealing contact with the valve seat and has a valve stem, and a seal that cooperates with a seat. Because the seat comprises a closed position seat, which is attached to (e.g., mounted on) a component that is displaceable relative to the valve stem, the distance from the valve disc to the seal is adjustable. Under stress, the components important for cleaning are no longer rigidly coupled to each other. The best cleaning position can therefore be adjusted with fewer compromises in the movement of the components, which improves the cleaning result.

These advantages are in particular apparent in a so-called double-seat valve in which a second closure member is connected to a second valve stem, and the valve stem is accommodated in the second valve stem. Such valves are regularly used in applications with elevated hygienic requirements, and therefore must be very effectively cleanable. Structurally simple and economical as well as reliable designs are required for this purpose.

To be able to easily bring about the displacement of the displaceable component in such a valve, it is advantageous if a third valve stem, accommodating the second valve stem, is provided in the gate valve. The third valve stem can be coupled to the displaceable component and to an auxiliary drive.

The hygienic properties of this gate valve are improved when an inner seal is arranged to interact with the displaceable component. This keeps substances from entering gaps between the displaceable component and valve stem that are needed in conjunction with the displaceable component.

An additional improvement in the hygienic properties arises when the closure member and the second closure member delimit a leakage space in this gate valve. This space can accommodate excess substances, cleaning fluid, and the like without these substances entering the actual product space.

According to another development, it is proposed to provide a surface with which, when there is fluid in an inner space, a force is generated that compensates for a force acting on the closure member. As a result, the valve is pressure-compensated. A fluid under pressure in the interior of the valve only exerts largely compensated forces on the closing element.

In another embodiment, the displaceable component comprises a recess for discharging cleaning fluid toward the valve stem. The recess gives rise to oblique walls that promote transport of liquid. The recess can for example be shaped conically. The cleaning of the valve is improved because the displaceable component can be rinsed, and the cleaning agent can be reliably discharged so that a targeted cleaning agent flow can be set.

Another development enables reliable operation of the gate valve. The displaceable component is prevented from being unintentionally displaced, for example while operating with product. Instead, the displaceable component remains in sealing position in that a shoulder is provided on the valve stem, and the displaceable component can be brought into a friction lock with the shoulder.

The cleanability of the displaceable component is increased according to a subsequent development in that a pot-shaped housing part is provided on a side of the housing facing a drive in which the displaceable component can be accommodated. This structure reduces the number of component interfaces and makes it possible to rinse the displaceable component with cleaning agent and thereby achieve a thorough cleaning.

Another embodiment provides that the displaceable component comprises a passage for discharging cleaning fluid that accommodates the cleaning fluid from an inner space of the pot-shaped component. This makes it possible to drain the cleaning agent through the gap between the valve stems and prevents an accumulation of the cleaning agent in the inner space.

BRIEF DESCRIPTION OF THE DRAWINGS

The invention will be described and the advantages thereof explained in more detail with reference to embodiments of the invention explained with reference to the examples in the drawings.

DETAILED DESCRIPTION

Example embodiments described below show double-seat valves. The invention is in principle not limited thereto and can also be used in single-seat and similar valves of the initially cited area of application. However, the advantages of improved cleaning are more apparent in double-seat valves because elevated hygienic requirements exist in their areas of application.

Figure 1:
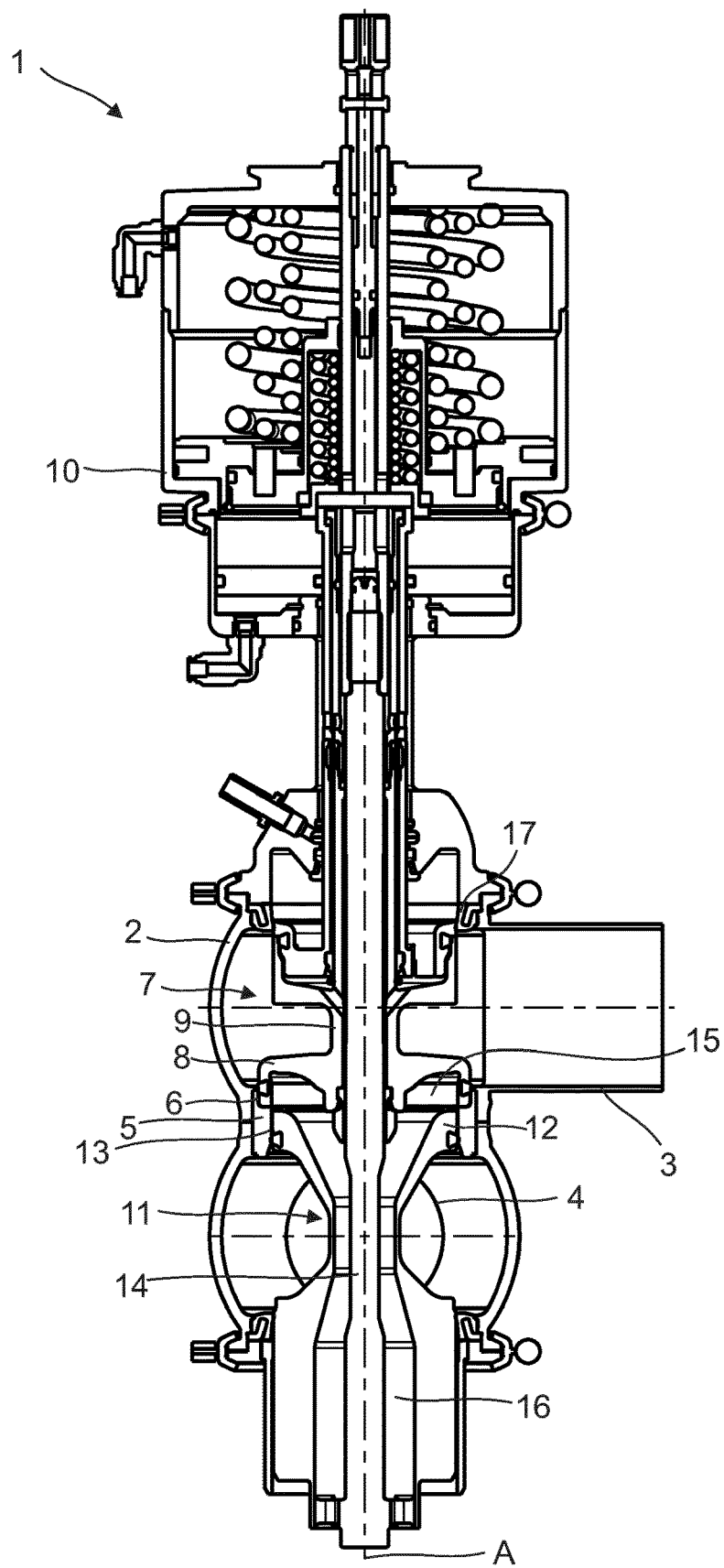
FIG. 1 shows a longitudinal section through a double-seat valve according to a first example in a closed position.

FIG. 1 shows a double-seat valve 1 in a first example in a longitudinal section.

The double-seat valve 1 possesses a housing 2 having a first port 3 and a second port 4. The first port 3 and the second port 4 are connectable to the fluid-conducting components of a processing facility. Between the first port 3 and the second port 4, a passage is provided in the housing with which a fluid connection can be established between the ports.

A valve seat 6 is formed at the passage 5 and surrounds an opening of the passage through which fluid can flow between the first port 3 and the second port 4.

A closing element 7 is provided in the housing 2. The closing element 7 comprises a closure member 8, which is in sealing contact with the valve seat 6 in FIG. 1. This prevents a flow of fluid between the first port 3 and the second port 4; the double seat-valve is in a closed position. The closing element 7 comprises a valve stem 9 connected to the closure member 8.

The valve stem 9 is operatively connected to a drive 10 coupled to the housing 2. The drive 10 is configured to move the closure member 8 along a longitudinal axis A. Within the context of this movement, the sealing contact between the valve seat 6 and the closure member 8 can on the one hand be established and can on the other hand be released. In the shown example, the drive 10 is designed as a pneumatic drive.

A second closing element 11 that possesses a second closure member 12 is arranged in the housing 2 of the double-seat valve 1. This can be brought into sealing contact within a second valve seat 13 that is formed on the passage 5. Such a sealing contact exists for example in the closed position of the double-seat valve 1 shown in FIG. 1. The second closure member 12 comprises a second valve stem 14 that is operatively connected to the drive 10.

The valve stem 9 of the closing element 7 can be designed at least sectionally as a hollow rod in which the second valve stem 14 is displaceably accommodated.

Between the first closure member 8 and the second closure member 12, a leakage space 15 is formed when the double-seat valve 1 is in the closed position and is sealed by the first closure member 8 and the second closure member 12 against the first port 3 and the second port 4. A discharge channel 16 draining the leakage space 15 is formed in the second closing element 11 and connects the leakage space 15 to drainage structures outside the double-seat valve 1.

One advantageously simple design provides that, to open the double-seat valve, the drive 10 brings the second closure member 12 into sealing contact with the first closure member 8. The first closure member 8 is entrained by the second closure member 12 during its lifting movement into an open position.

A seal 17 seals the closing element 7 against the housing 2. The closing element 7 is displaceable relative to the seal 17, and a sealing contact between the seal 17 and closing element 7 exists at least when the double-seat valve 1 is in the closed position and in the open position.

Figure 2:
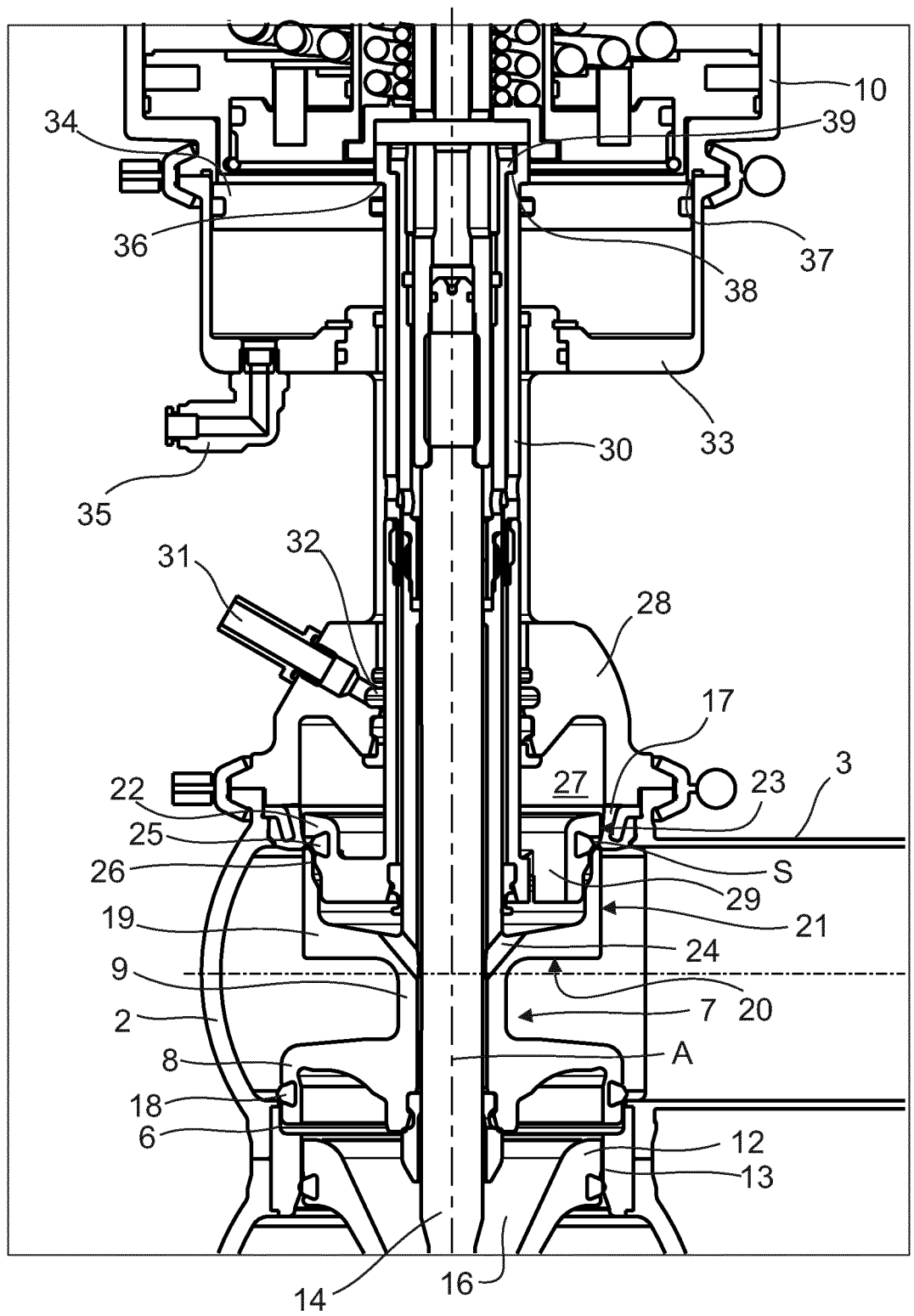
FIG. 2 shows a detail view of the cleaning position of the seal.

This seal 17 needs to be cleaned to improve the hygienic conditions. The cleaning of the seal 17 of the double-seat valve 1 according to this embodiment will now be explained with reference to FIG. 2. FIG. 2 shows a section of the double-seat valve 1 in a slightly enlarged view.

When the double-seat valve 1 is in a switched position shown in FIG. 2, the second closure member 12 is in sealing contact with the second valve seat 13. The closure member 8 of the closing element 7 is contrastingly lifted from the valve seat 6 to form a gap. In this lifted position created in this way, a main seal 18 provided on the closure member 8 is separated from the valve seat 6 and is exposed for cleaning.

On a side facing the drive, the closure member 8 is connected to the valve stem 9. Following at a distance along the longitudinal axis A, the valve stem 9 has a stem section 19. This can be advantageously expanded radially and even more advantageously can possess a balancer function. A balancer function means that the force that a fluid exerts in the inner space of the double-seat valve 1 on the closure member 8 is compensated by an opposite force on the stem section 19. That is, a force is generated that compensates for a force acting on the closure member 8. This is achieved by a suitable choice of a surface 20 of the stem section 19 exposed to the fluid, for example by forming it annularly around the longitudinal axis A and aligning the longitudinal axis A substantially parallel to a surface normal to this surface 20.

The stem section possesses a cylindrical surface 21. An axis of rotation of the cylinder is aligned with the longitudinal axis A, preferably parallel to the stroke direction. This cylindrical surface 21 is designed for interaction with the seal 17, in particular by a sliding and sealing contact.

The sections of the closing element 7 can be several parts connected to each other. Alternatively, the closing element can be a part formed from a main body.

A component 22 displaceable against the valve stem 9 is designed to interact with the stem section 19 and the seal 17.

A surface facing radially to the outside can be brought into resting, sealing contact with the seal 17. When the double seat valve 1 is in the closed position, the surface interacts with the seal 17 as a closed position seat 23. The seal 17 is spared when the surface of the closed position seat 23 and the cynical surface 21 are aligned with each other. By displacing the displaceable component 22, the cylindrical surface 21 and closed position seat 23 can be connected to each other to form a seat for the seal 17.

When in the cleaning position according to FIG. 2, the displaceable component 22 is moved away from the stem section 19 along the longitudinal axis A. The seal 17 is not in contact with the cylindrical surface 21 and is not in contact with the closed position seat 23. A gap S is formed between the cylindrical surface 21 and the closed position seat 23. In the cleaning position, the gap S is in fluid connection with a channel 24 formed in the stem section 19 that, for its part, is in fluid connection with the discharge channel 16. Cleaning fluid flows past the seal 17 in a cleaning manner and into the gap S to be discharged from there through the channel 24.

During cleaning, an inner seal 25 is also cleaned along which the cleaning fluid flows in a cleaning manner from the gap S to the channel 24. The inner seal 25 can be brought into sealing contact with an inner seat 26 formed on the section 19 in order, for example, to seal the stem section 19 and displaceable component 22 against each other in the closed position according to FIG. 1.

A part of the cleaning fluid flowing between the seal 17 and movable component 22 does not enter the gap S but instead flows between the seal 17 and closed position seat 23. This cleans the seal 17 and closed position seat 23. This part of the cleaning fluid enters an inner space 27 of a pot-shaped housing part 28 that is connected to the housing 2. A passage 29 in the displaceable component 22 establishes a fluid connection with the channel 24 to discharge to the cleaning fluid from the pot-shaped housing part 28 and ultimately the double-seat valve 1.

The displaceable component 22 is connected to a single-part or multi-part third valve stem 30. The displaceable component 22 is designed as a hollow rod and accommodates the valve stem 9 and the second valve stem 14. The third valve stem 30 passes through the pot-shaped housing part 28 as well as its inner space 27 and passes out of the housing part 28. A flushing inlet 31 can be provided in the pot-shaped housing part 28 through which flushing inlet 31 cleaning agent can flow in. This is accommodated by a flow guide 32, which is flow-connected to the flushing inlet 31 and surrounds the region of the passage. The cleaning of the third valve stem 30, the region of the passage, and the inner space 27 are thereby improved.

The drive 10 comprises an auxiliary drive 33, which can be designed modular and is arranged on a side of the drive facing the pot-shaped housing part 28 to simplify construction.

The third valve stem 30 extends into the auxiliary drive 33. A piston 34 is slidably provided thereon in the auxiliary drive 33. A pressure medium inlet 35 allows the entry of a pressure medium that acts on the piston 34 and causes its displacement along the longitudinal axis A.

The third valve stem 30 possesses a first stop 36. This can be formed as a step or shoulder directed radially outwards with respect to the longitudinal axis A. The movement of the piston 34 under the influence of the pressure medium causes the piston 34 to engage (e.g., in a friction lock) with the first stop 36 so that the third valve stem 30 is entrained in the direction of the longitudinal axis A during the movement of the piston 34. The movement of the piston 34 is stopped by a housing-side travel limit 37. The traveled distance is measured such that the displaceable component 22 reaches the cleaning position described above and shown in FIG. 2.

A second stop 38 is provided on the third valve stem 30 and is configured to be brought into engagement with a third stop 39, which third stop 39 is arranged on the valve stem 9. The second stop 38 can be formed as an end-face surface of a step in the interior of the third valve stem 30 with which an interior space of the third valve stem 30 is expanded. The third stop 39 can be a step that forms a radial expansion of the valve stem 9. During a displacement of the third valve stem 30, the second stop 38 and the third stop 39 come into engagement. As a consequence, the valve stem 9 is entrained by the third valve stem 30 as it moves. The valve stem 9 and the third valve stem 30, and therefore the displaceable component 22 and the closure member 8, move in the same direction.

The choice of a distance between the second stop 38 and the third stop 39 in the direction of the longitudinal axis A determines the difference in travel between the paths traveled during the stroke by the displaceable component 22 and the closure member 8. This allows the cleaning gap to be optimally adjusted to the cleaning result.

Figure 3:
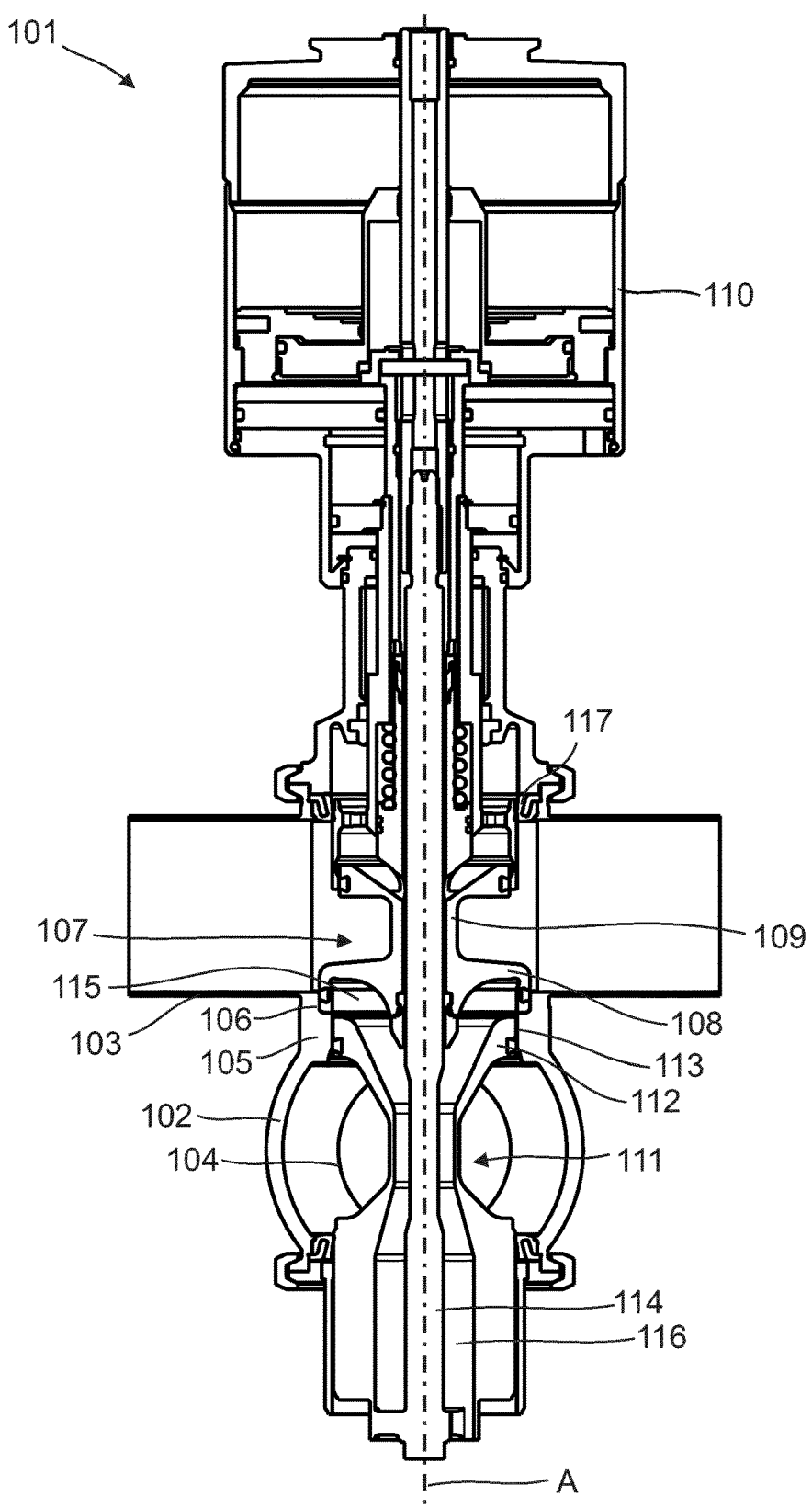
FIG. 3 shows a longitudinal section through a double-seat valve according to a second example in a closed position.

A second embodiment will be explained below with reference to FIG. 3 and FIG. 4.

The double-seat valve 101 possesses a housing 102 having a first port 103 and a second port 104. The first port 103 and the second port 104 are connectable to the fluid-conducting components of a processing facility. Between the first port 103 and the second port 104, a passage 105 is provided in the housing with which a fluid connection can be established between the ports.

A valve seat 106 is formed at the passage 105 and surrounds an opening of the passage 105 through which fluid can flow between the first port 103 and the second port 104.

A closing element 107 is provided in the housing 102. The closing element 107 comprises a closure member 108 that is in sealing contact with the valve seat 106 in FIG. 1. This prevents a flow of fluid between the first port 103 and the second port 104. The double seat-valve is in a closed position. The closing element 107 comprises a valve stem 109 connected to the closure member 108.

The valve stem 109 is operatively connected to a drive 110 coupled to the housing 102. This drive 110 is configured to move the closure member 108 along a longitudinal axis A. Within the context of this movement, the sealing contact between the valve seat 106 and closure member 108 can on the one hand be established and can on the other hand be released. In the shown example, the drive 110 is designed as a pneumatic drive.

A second closing element 111 that possesses a second closure member 112 is arranged in the housing 102 of the double-seat valve 101. The second closing element 111 can be brought into sealing contact within a second valve seat 113 that is formed on the passage 5. Such a sealing contact exists for example when the double-seat valve 101 is in the closed position shown in FIG. 3. The closure member 112 comprises a second valve stem 114 operatively connected to the drive 110.

The valve stem 109 of the closing element 107 can be designed at least sectionally as a hollow rod in which the second valve stem 114 is displaceably accommodated.

Between the first closure member 108 and the second closure member 112, a leakage space 115 is formed when the double-seat valve 101 is in the closed position, which is sealed by the first closure member 108 and the second closure member 112 against the first port 103 and the second port 104. A discharge channel 116 draining the leakage space 115 is formed in the second closing element 111 and connects the leakage space 115 to drainage structures outside the double-seat valve 101.

One advantageous design provides that, to open the double-seat valve, the drive 110 brings the second closure member 112 into sealing contact with the first closure member 108. The first closure member 108 is entrained by the second closure member 112 during its lifting movement into open position.

A seal 117 seals the closing element 107 against the housing 102. The closing element 107 is displaceable relative to the seal 117, and a sealing contact between the seal 117 and closing element 107 exists at least when the double-seat valve 101 is in the closed position and in the open position.

This seal 117 needs to be cleaned to improve the hygienic conditions. The cleaning of the seal 117 of the double-seat valve 101 according to this embodiment will now be explained with reference to FIG. 4. FIG. 4 shows a section of the double-seat valve 101 in a slightly enlarged view.

Figure 4:
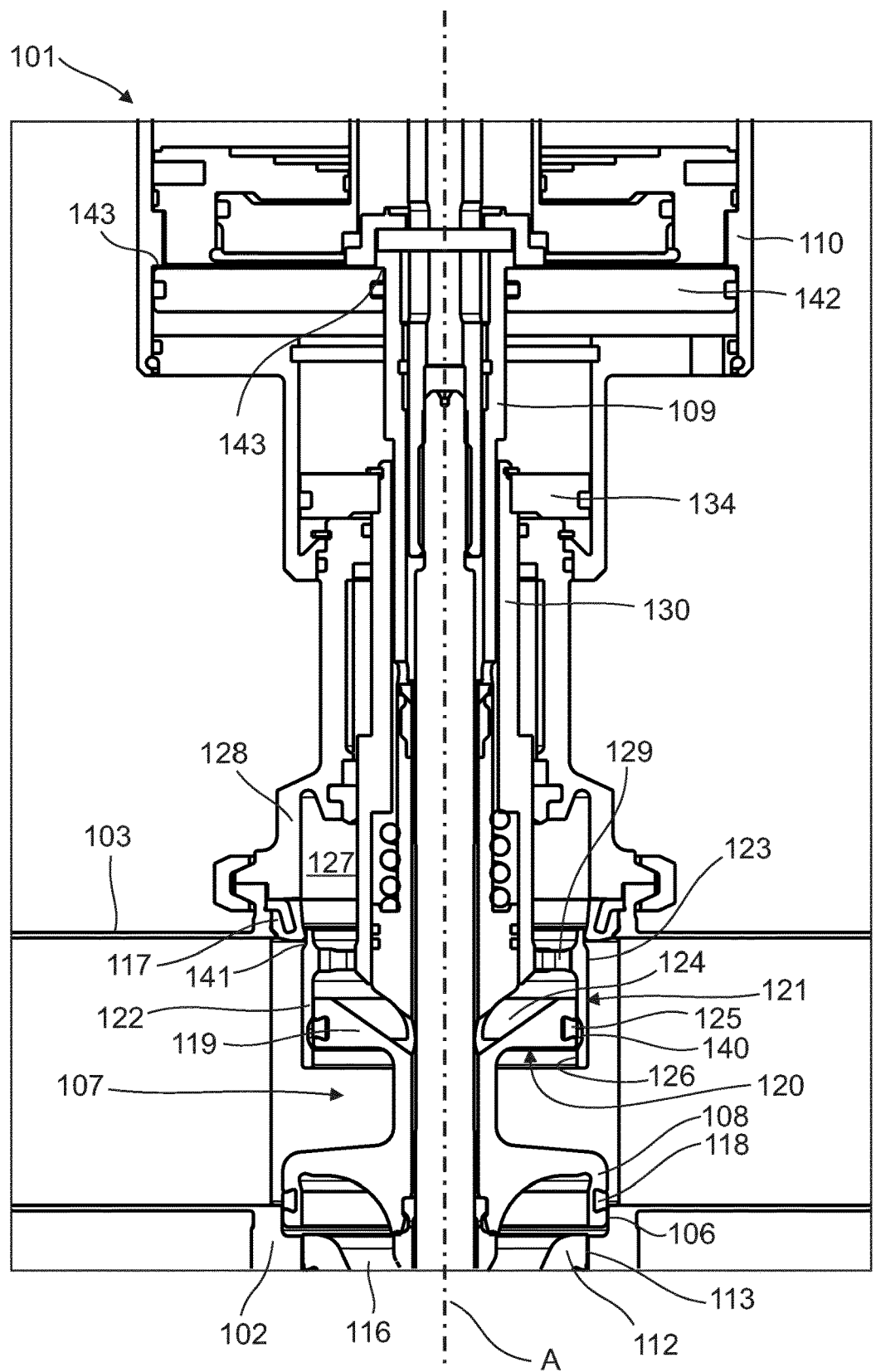
FIG. 4 shows a longitudinal section through a double-seat valve according to the second example in a cleaning position.

When the double-seat valve 101 is in switched position shown in FIG. 4, the second closure member 112 is in sealing contact with the second valve seat 113. The closure member 108 of the closing element 107 is contrastingly lifted from the valve seat 106 to form a gap. In this lifted position created in this way, a main seal 118 provided on the closure member 108 is separated from the valve seat 106 and is exposed for cleaning.

In the switched position according to FIG. 4, the seal 117 is also exposed so as to be cleanable. In particular, the surfaces of the seal 117 coming into contact with product or seat surfaces in other switched positions can be rinsed with cleaning fluid in the switched position according to FIG. 4. This is brought about by displacing a displaceable component 122 toward the closure member 108 opposite the direction of movement thereof, wherein the seal 117 is lifted from a closed position seat 123 provided on the displaceable component 122.

A cylindrical surface 121 of the displaceable component 122 facing radially to the outside is designed for sliding contact with the seal 117 and, when the double-seat valve 101 is in the open position, forms a seat for the seal 117.

A stem section 119 of the closing element 107 is displaceably accommodated in the displaceable component 122. In particular, displacement can be carried out in the opposite direction of movement along the longitudinal axis A. As in the first embodiment, the stem section 119 can be designed to compensate pressure with respect to the closure member 108.

An inner seat 126 is formed on an inner side of the displaceable component 122 with which an inner seal 125 arranged on the stem section 119 can be brought into sealing contact. In particular, this contact consists of a closed position and an open position of the double-seat valve 101.

In the cleaning position according to FIG. 4, the inner seal 125 and inner seat 126 are separated from each other. On the inner side of the displaceable component 122, an annular peripheral cutout 140 can be provided that creates a gap in the cleaning position between the inner seal 125 and displaceable component 122. This gap exposes the inner seal 125 to cleaning.

A pot-shaped housing component 128 is provided on the side of the housing 102 facing a drive 110. The pot-shaped housing component 128 possesses an inner space 127 separate from an environment of the double seat valve 101 in which the displaceable component 122 is accommodated when the double-seat valve 101 is in the open position.

Cleaning fluid that flows between the displaceable component 122 and the seal 117 in the cleaning position shown in FIG. 4 enters the inner space 127. This fluid is discharged through at least one passage 129 provided in the displaceable component 122. At least one channel 124 is provided in the stem section 119 that accommodates the fluid from the passage 129. In addition, the channel 124 also accommodates cleaning fluid that flows between the inner seal and the displaceable component 122. The fluid is supplied through the channel 124 to the discharge channel 116 through which the fluid flows out of the double-seat valve 101.

An end of the displaceable component 122 facing the interior can be designed to taper, for example by a circumferential twist 141. The twist 141 is arranged and dimensioned so that it is not in contact with the seal 117 in the cleaning position, and the displaceable component 122 is still immersed in a part of the inner space 127 enclosed by the seal 117. The twist 141 transitions into the cylindrical surface 121 such that the seal 117 slides on the cylindrical surface 121 when the displaceable component 122 is displaced into the inner space 127. This improves the guidance of the displaceable component 122 and protects the seal 117.

The drive 110 possesses a lift piston 142 that is slidably arranged on the valve stem 109. The drive 110 and lift piston 142 are designed so that when pressure is applied to the lift piston 142, the lift piston 142 moves away from the housing 2 along the longitudinal axis A. During this movement, the lift piston 142 runs into a stop 143 on the valve stem 109, which causes the lift piston 142 to be entrained following the movement. The movement is limited by a stop 143, and the cleaning position of the closure member 108 is thereby determined.

A third valve stem 130 is designed as a hollow rod in which the valve stem 109 is movably accommodated. The third valve stem 130 is connected to the movable component 122. A piston 134 is rigidly coupled to the third valve stem 130. The piston 134 is designed to be pressurized with a pressure medium. Pressurization by the pressure medium moves the piston 134 in a direction opposite the direction of movement of the lift piston 142. The rigid coupling with the third valve stem 130 results in a movement of the movable component 122 that is opposite the movement of the closure member 108 and the stem section 119.

The stem section 119 can have a surface 120 configured as shown in the first embodiment to establish an equilibrium between forces directed upward and downward in the figure when fluid is in the inner space 127.

Figure 5:
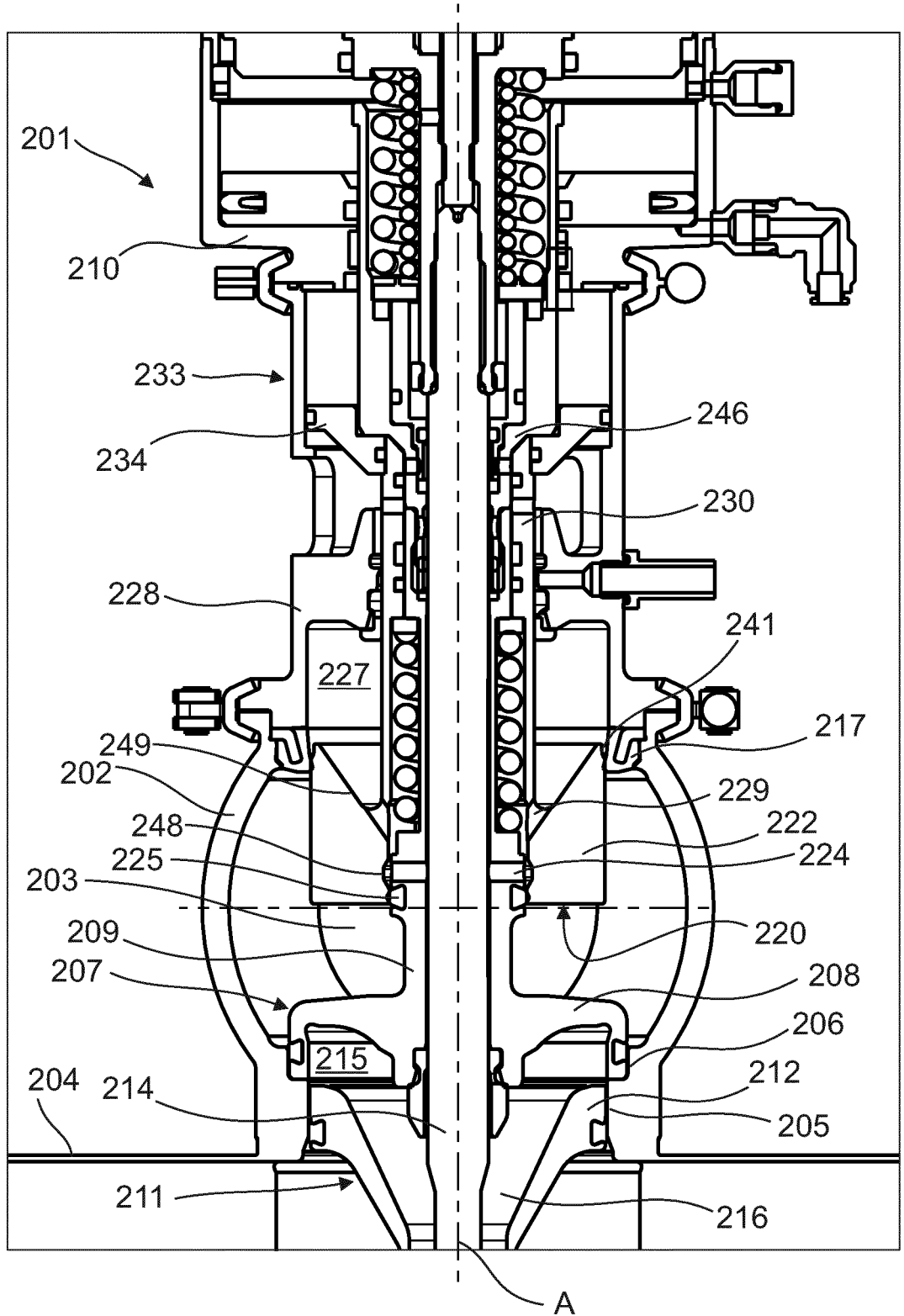
FIG. 5 shows a detailed section through a double-seat valve according to a third example.

FIG. 5 shows a double-seat valve in another embodiment in section and in a detail view.

In this example, a surface 220 having the pressure compensation function of the surfaces 20 and 120 of the previous examples is arranged on the slidable component 222. Whereas in the first of the two examples, the one-piece design of each stem section 19 and 119 prevents a displacement of the surface 20 and 120 relative to the closure member 8 and 108, the possibility of displacement must be taken into account in the two-part solution of the third example. This is done with the aid of a shoulder 246 on which the third valve stem 230 is supported, in particular where the double-seat valve is in the product-conveying operating state. The shoulder 246 is on a stem section that is coupled to the valve stem 209.

This double-seat valve 201 also possesses a housing 202 with a first port 203, a second port 204, and a passage 205. A valve seat 206 is arranged in the fluid connection between the first port 203 and the second port 204 in the housing 202. This passage 205 can be closed with a closure member 208 and a second closure member 212. The closure member 208 is part of a closing element 207 that is connected to a valve stem 209. The second closure member 212 is part of a second closure closing element 211 and is connected to a second valve stem 214. The closure member 208 and second closure member together delimit a leakage space 215.

A seal 217 is arranged on the housing 202 and is in sealing contact with the displaceable component 222 and thereby seals a gap between the displaceable component 222 and the housing 202. A closed position seat 223 is formed on the displaceable component 222 with which the seal 217 is in touching contact when the double-seat valve 201 is in the closed position shown in FIG. 5.

The displaceable component 222 is shaped such that, during the transition into the open position and in the open position itself, the seal 217 and the displaceable component 222 are in sealing contact. For the open position, the displaceable component 222 is displaced toward the drive—upward and away from the passage 205 in the illustration.

In a cleaning position, the displaceable component 222 is moved toward the closure member 208, and the contact between the displaceable component 222 and the seal 217 is released while forming a gap. The cleaning fluid can then flow through this gap.

This gap formation can be supported by a twist 241, wherein the twist 241 is preferably designed according to the aspects of the twist 141 described with respect to the second embodiment.

The displacement of the displaceable component 222 can be brought about by an auxiliary drive 233, which can be arranged between the housing 202 and a drive 210. The third valve stem 230 extends into the auxiliary drive 233. A pressurizable piston 234 is provided there, which entrains the third valve stem 230 during its movement caused by pressurization.

An inner seal 225 is arranged on the valve stem 209. This sealingly touches the displaceable component 222, in particular where the double-seat valve 201 is in the closed position and the open position. Preferably, the inner seal 225 is designed as a radial seal accommodated in a cylindrical contour on the displaceable component 222.

In the cleaning position where the displaceable component 222 and valve stem 209 have been displaced relative to each other, the inner seal 225 can be brought to the same level with a circumferential groove 248 with respect to the longitudinal axis A and therefore to contact-free congruence. In this arrangement, the inner seal 225 is exposed, and a gap flow of cleaning fluid can be produced that flows between the displaceable component 222 and the valve stem 209 over the inner seal 225 and cleans the inner seal 225.

A pot-shaped housing part 228 is on the side of the housing 202 facing the auxiliary drive 233. The pot-shaped housing part 228 surrounds an inner space 227 in which the displaceable component 222 can at least be sectionally accommodated. In particular, where the double seat-valve 201 is in the open position, the displaceable component 222 dips into the inner space 127. The inner space 127 and the pot-shaped housing part 228 are penetrated by nesting valve stems 209, 214, and 230 along the longitudinal axis A.

Toward the auxiliary drive, the displaceable component 222 possesses a recess 249 that is, for example, conically shaped. Cleaning fluid, which flows through the gap between the seal 217 and the displaceable housing part 228 when the double-seat valve 201 is in the cleaning position, flows through the inner space 127 and is accommodated by the recess 249. The inclination of a wall of the recess relative to the longitudinal axis A is configured such that the accommodated cleaning fluid is directed towards the third valve stem 230. At least one passage 229 is provided in the third valve stem 230 through which the cleaning fluid is discharged out of the recess in the gap between the valve stem 209 and the third valve stem 230. At least one channel 224 runs through the valve stem 209; preferably, several are provided distributed in the circumferential direction. Through this channel 224, the cleaning fluid from the gap between the valve stem 209 and the displaceable component 222 and the third stem 230 is conveyed further into a gap between the valve stem 209 and the second valve stem 214. From there, the cleaning fluid is removed from the double-seat valve 201 through a discharge channel 216.

The following is a list of reference signs used in this specification and in the drawing figures.

1; 101; 201 Double seat valve
2; 102; 202 Housing
3; 103; 203 First port
4; 104; 204 Second port
105; 205 Passage
6; 106; 206 Valve seat
7; 107; 207 Closing element
8; 108; 208 Closure member
9; 109; 209 Valve stem
110; 210 Drive
11; 111; 211 Second closing element
12; 112; 212 Second closure member
13; 113 Second valve seat
14; 114; 214 Second valve stem
115; 215 Leakage space
16; 116; 216 Discharge channel
17; 117; 217 Seal
18; 118 Main seal
19; 119 Stem section
120; 220 Surface
21, 121 Cylindrical surface
22; 122; 222 Displaceable component
23; 123; 223 Closed position seat
24; 124; 224 Channel
125; 225 Inner seal
26; 126 Inner seat
27; 127; 227 Inner space
28; 128; 228 Pot-shaped housing part
29; 129; 229 Passage
130; 230 Third valve stem
31 Flushing inlet
32 Flow guide
33; 233 Auxiliary drive
34; 134 Piston
Pressure medium inlet
36 First stop
37 Travel limit
38 Second stop
39 Third stop
140 Cutout
141; 241 Twist
142 Lift piston
143 Stop
144 Lift limit
246 Shoulder
248 Peripheral groove
249 Recess
A Longitudinal axis
S Gap

The invention claimed is:

1. A gate valve, comprising:
a housing;
a first port;
a second port;
a passage between the first port and the second port;
a valve seat formed at the passage;
a closing element including:
  a valve stem, and
  a closure member that can be brought into sealing contact with the valve seat; and
a seal that seals the closing element against the housing and cooperates with a seat,
wherein the seat comprises a closed position seat mounted on a displaceable component that is displaceable relative to the valve stem, and the displaceable component comprises a recess for discharging cleaning fluid toward the valve stem.

2. The gate valve according to claim 1, comprising:
a surface with which, when there is fluid in an inner space, a force is generated that compensates for a force acting on the closure member.

3. The gate valve according to claim 1, comprising:
a shoulder on the valve stem, wherein the displaceable component can be brought into a friction lock with the shoulder.

4. The gate valve according to claim 1, comprising:
a pot-shaped housing part on a side of the housing facing a drive, in which the displaceable component can be accommodated.

5. The gate valve according to claim 4, wherein, for discharging cleaning fluid, the displaceable component has a passage that accommodates the cleaning fluid from an inner space of the pot-shaped housing part.

6. The gate valve according to claim 1, comprising:
a second closure member connected to a second valve stem wherein the valve stem is accommodated in the second valve stem.

7. The gate valve according to claim 6, comprising:
an inner seal arranged to interact with the displaceable component.

8. The gate valve according to claim 6, wherein the closure member and the second closure member delimit a leakage space.

9. The gate valve according to claim 6, comprising:
a surface with which, when there is fluid in an inner space, a force is generated that compensates for a force acting on the closure member.

10. The gate valve according to claim 6, comprising:
a shoulder on the valve stem, wherein the displaceable component can be brought into a friction lock with the shoulder.

11. The gate valve according to claim 6, comprising:
a pot-shaped housing part on a side of the housing facing a drive, in which the displaceable component can be accommodated.

12. The gate valve according to claim 11, wherein, for discharging cleaning fluid, the displaceable component has a passage that accommodates the cleaning fluid from an inner space of the pot-shaped housing part.

13. The gate valve according to claim 6, comprising:
a third valve stem accommodating the second valve stem.

14. The gate valve according to claim 13, wherein the closure member and the second closure member delimit a leakage space.

15. The gate valve according to claim 13, comprising:
a surface with which, when there is fluid in an inner space, a force is generated that compensates for a force acting on the closure member.

16. The gate valve according to claim 13, comprising:
an inner seal arranged to interact with the displaceable component.

17. The gate valve according to claim 16, wherein the closure member and the second closure member delimit a leakage space.

18. A gate valve, comprising:
a housing;
a first port;
a second port;
a passage between the first port and the second port;
a valve seat formed at the passage;
a closing element including:
   a valve stem, and
   a closure member that can be brought into sealing contact with the valve seat;
a seal that seals the closing element against the housing and cooperates with a seat, wherein the seat comprises a closed position seat mounted on a displaceable component that is displaceable relative to the valve stem; and
a shoulder on the valve stem, wherein the displaceable component can be brought into a friction lock with the shoulder.

19. A gate valve, comprising:
a housing;
a first port;
a second port;
a passage between the first port and the second port;
a valve seat formed at the passage;
a closing element including:
   a valve stem, and
   a closure member that can be brought into sealing contact with the valve seat;
a seal that seals the closing element against the housing and cooperates with a seat, wherein the seat comprises a closed position seat mounted on a displaceable component that is displaceable relative to the valve stem; and
a pot-shaped housing part on a side of the housing facing a drive, in which the displaceable component can be accommodated.

20. The gate valve according to claim 19, wherein, for discharging cleaning fluid, the displaceable component has a passage that accommodates the cleaning fluid from an inner space of the pot-shaped housing part.

* * * * *